(12) United States Patent
Kirkhope et al.

(10) Patent No.: US 9,879,784 B2
(45) Date of Patent: Jan. 30, 2018

(54) ROTARY SEAL ASSEMBLY FOR ACCOMMODATING RADIAL DEFLECTION AND TILTING

(71) Applicant: Halliburton Energy Services, Inc., Houston, TX (US)

(72) Inventors: Kennedy J. Kirkhope, Nisku (CA); Everett Philip Hagar, Devon (CA); Alben D'Silva, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/909,029

(22) PCT Filed: Dec. 18, 2013

(86) PCT No.: PCT/CA2013/001064
§ 371 (c)(1),
(2) Date: Jan. 29, 2016

(87) PCT Pub. No.: WO2015/089620
PCT Pub. Date: Jun. 25, 2015

(65) Prior Publication Data
US 2016/0178061 A1 Jun. 23, 2016

(51) Int. Cl.
*F16J 15/3248* (2016.01)
*F16J 15/3224* (2016.01)
(Continued)

(52) U.S. Cl.
CPC .......... *F16J 15/3248* (2013.01); *E21B 4/003* (2013.01); *E21B 7/062* (2013.01); *F16J 15/3224* (2013.01); *F16J 15/3276* (2013.01)

(58) Field of Classification Search
CPC ............................................. F16J 15/02–15/32
See application file for complete search history.

(56) References Cited

U.S. PATENT DOCUMENTS 2,126,007 A * 8/1938 Guiberson ............ E21B 33/085
  175/207
2,806,748 A * 9/1957 Krotz ................... B63H 23/321
  277/503

(Continued)

FOREIGN PATENT DOCUMENTS

CA 2806953 10/2013
CN 1350132 A 5/2002
(Continued)

*Primary Examiner* — Vishal A Patel
(74) *Attorney, Agent, or Firm* — Terrence N. Kuharchuk; Parlee McLaws LLP; Clive D. Menezes

(57) ABSTRACT

In an apparatus having a housing, a housing bore, and a shaft rotatably extending through the housing bore, a rotary seal assembly which includes a seal carrier retainer connected with the housing and defining a cavity surrounding the shaft, a seal carrier positioned within the cavity of the seal carrier retainer, wherein the seal carrier is capable of an amount of radial deflection and tilting both relative to the seal carrier retainer and wherein the seal carrier is retained by the seal carrier retainer so that rotation of the seal carrier relative to the seal carrier retainer is prevented, a rotary shaft seal carried by the seal carrier between the seal carrier and the shaft, and a seal carrier seal interposed between the seal carrier and the seal carrier retainer.

17 Claims, 5 Drawing Sheets

(51) Int. Cl.
*E21B 7/06* (2006.01)
*E21B 4/00* (2006.01)
*F16J 15/3276* (2016.01)

(56) References Cited

U.S. PATENT DOCUMENTS

| | | | |
|---|---|---|---|
| 3,325,232 A | 6/1967 | Pabst et al. | |
| 4,133,541 A * | 1/1979 | Kirk | F01D 25/186 227/65 |
| 4,480,842 A * | 11/1984 | Mahyera | E21B 33/08 277/329 |
| 4,513,817 A | 4/1985 | Weinberg | |
| 5,076,589 A * | 12/1991 | Marsi | F16J 15/006 277/319 |
| 5,330,001 A | 7/1994 | Baugh et al. | |
| 5,738,356 A * | 4/1998 | Marshall | F01D 25/186 277/313 |
| 5,875,859 A | 3/1999 | Ikeda et al. | |
| 6,210,103 B1 * | 4/2001 | Ramsay | F16C 25/02 277/318 |
| 6,244,361 B1 | 6/2001 | Comeau et al. | |
| 6,412,783 B1 * | 7/2002 | Finnestad | E21B 33/08 166/84.1 |
| 6,585,416 B1 * | 7/2003 | Rimmer | F04B 53/144 277/503 |
| 6,637,509 B2 * | 10/2003 | Farquharson | E21B 33/08 166/241.2 |
| 6,769,499 B2 | 8/2004 | Cargill et al. | |
| 7,004,263 B2 | 2/2006 | Moriarty et al. | |
| 7,055,825 B2 * | 6/2006 | Watanabe | F16J 15/006 277/349 |
| 7,090,222 B2 | 8/2006 | Watanabe et al. | |
| 7,592,571 B2 * | 9/2009 | Theodos | A47J 37/1261 219/430 |
| 7,997,858 B2 | 8/2011 | Mikulec | |
| 8,083,235 B2 * | 12/2011 | Azibert | F16J 15/54 277/349 |
| 2003/0235354 A1 * | 12/2003 | Orlowski | F16C 23/045 384/192 |
| 2009/0194950 A1 | 8/2009 | Orlowski et al. | |
| 2009/0218770 A1 * | 9/2009 | Azibert | F16J 15/54 277/309 |

FOREIGN PATENT DOCUMENTS

| | | |
|---|---|---|
| CN | 101087969 A | 12/2007 |
| CN | 101825180 A | 9/2010 |
| RU | 2230170 C2 | 6/2004 |
| WO | 2001021929 A1 | 3/2001 |

* cited by examiner

ROTARY SEAL ASSEMBLY FOR ACCOMMODATING RADIAL DEFLECTION AND TILTING

TECHNICAL FIELD

A rotary seal assembly for accommodating an amount of radial deflection and/or tilting between a housing and a rotatable shaft.

BACKGROUND OF THE INVENTION

An apparatus comprising a rotatable shaft extending through a housing bore may include one or more bearings and one or more rotary seal assemblies.

The bearings may support the shaft within the housing bore and/or transfer forces between the shaft and the housing.

The rotary seal assemblies may inhibit fluids and/or debris from transferring between an exterior of the housing and an interior of the housing.

In some such apparatus, the shaft may be capable of an amount of radial deflection within the housing bore and/or an amount of tilting within the housing bore.

Radial deflection of the shaft may result in the shaft becoming non-concentric with the housing bore as the shaft shifts radially within the housing bore. This non-concentricity of the shaft within the housing bore may negatively affect the performance of a rotary seal assembly.

Tilting of the shaft within the housing bore may result from radial deflection of a portion of the shaft, and may be accompanied by a bending and/or articulation of the shaft within the housing bore. Tilting of the shaft may be caused intentionally for the functioning of the apparatus, and/or may be the result of forces acting on the shaft during use of the apparatus. This tilting of the shaft within the housing bore may also negatively affect the performance of a rotary seal assembly.

In some apparatus, tilting of the shaft within the housing bore may be caused or accommodated by a bearing which enables the shaft to tilt relative to the housing. An example of such a bearing is a fulcrum bearing or focal bearing as described in U.S. Pat. No. 6,244,361 (Comeau et al) and U.S. Pat. No. 6,769,499 (Cargill et al), which are directed at "point-the-bit" types of rotary steerable drilling apparatus.

BRIEF DESCRIPTION OF DRAWINGS

Embodiments of the invention will now be described with reference to the accompanying drawings, in which.

DETAILED DESCRIPTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present invention is directed at a rotary seal assembly.

The rotary seal assembly may be used in any apparatus comprising a housing, a housing bore, and a shaft rotatably extending through the housing bore, wherein the shaft is capable of an amount of radial deflection within the housing bore and an amount of tilting within the housing bore.

In some embodiments, the apparatus may be configured to be contained within a borehole. In some embodiments, the apparatus may be an apparatus for use in drilling a borehole. In some embodiments, the apparatus may be a drilling motor. In some embodiments, the apparatus may be a rotary steerable drilling apparatus. In some particular embodiments, the apparatus may be a "point-the-bit" type of rotary steerable drilling apparatus.

Figure 1:
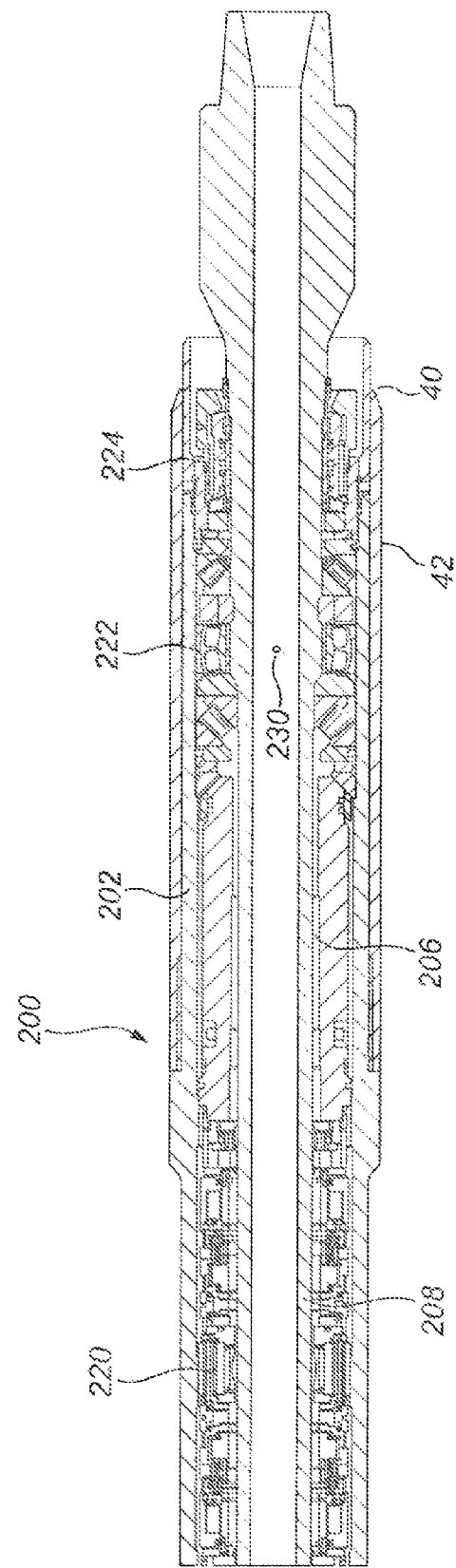
FIG. 1 is a partial longitudinal section assembly drawing of a lower portion of a point-the-bit rotary steerable drilling apparatus, including a first exemplary embodiment of a rotary seal assembly according to the invention as a lower rotary seal assembly.
Figure 2:
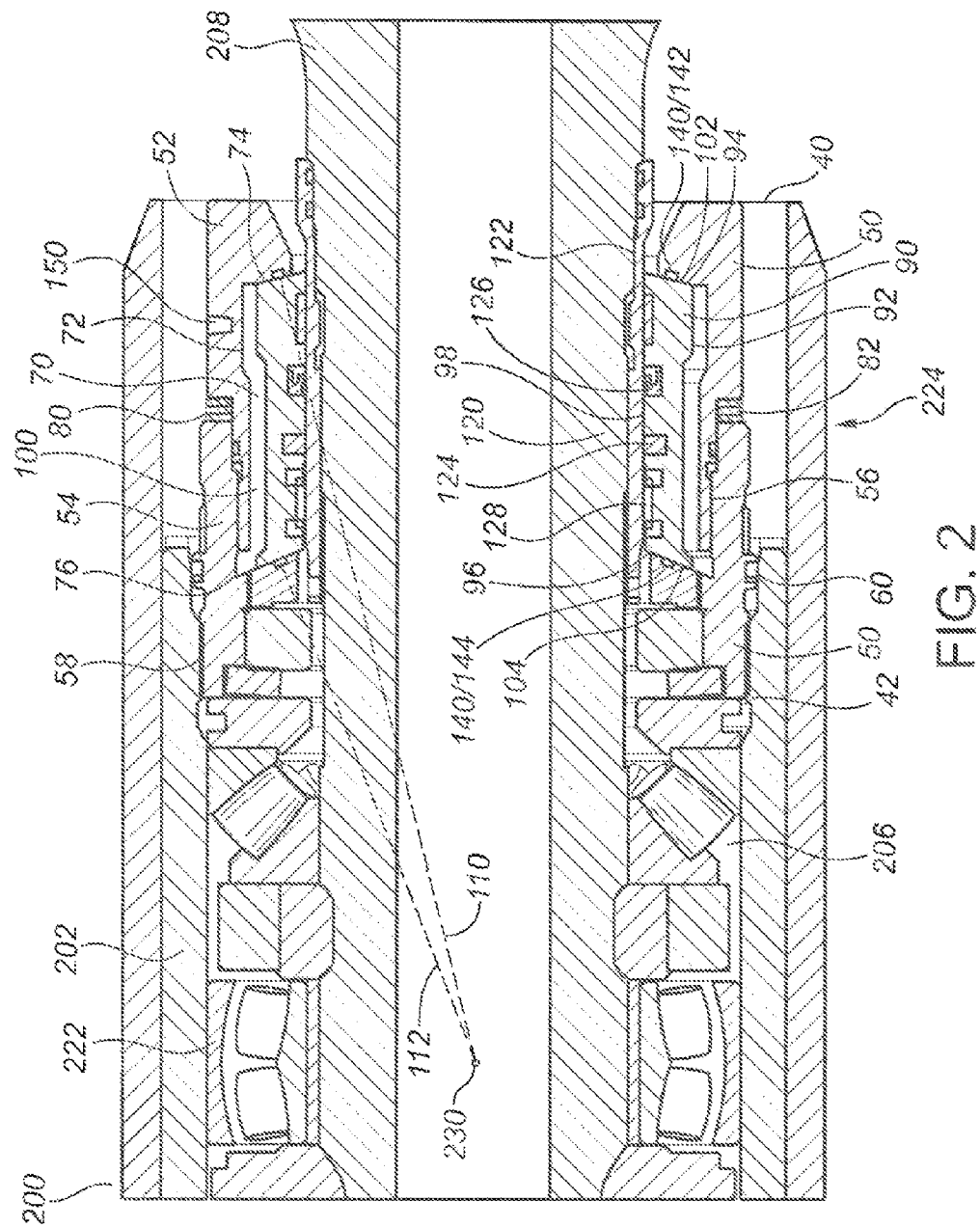
FIG. 2 is a partial longitudinal section assembly drawing of a lower end of the point-the-bit rotary steerable drilling apparatus of FIG. 1, showing a focal bearing and the first exemplary embodiment of the rotary seal assembly in greater detail.
Figure 3:
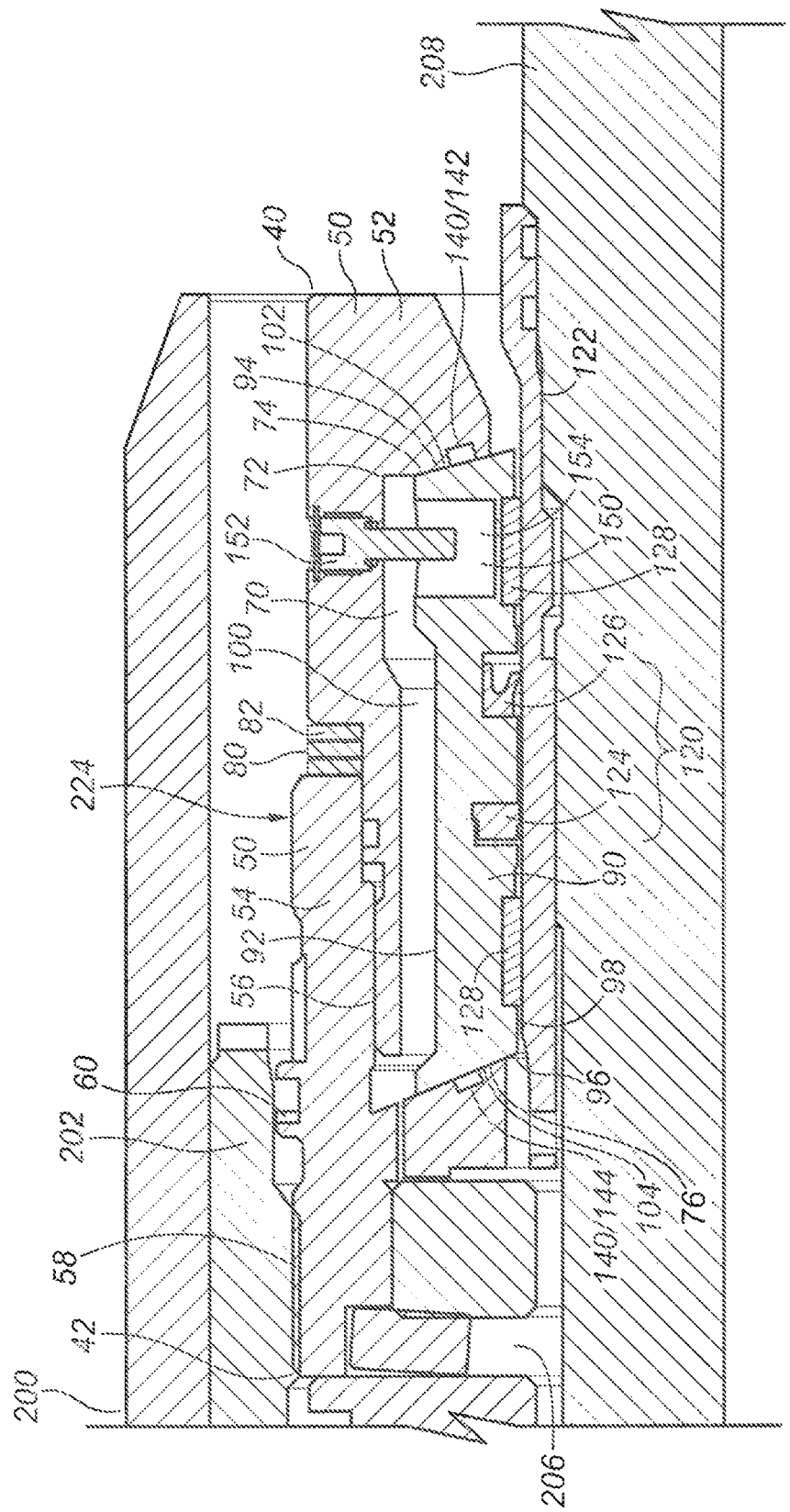
FIG. 3 is a partial longitudinal section assembly drawing of the point-the-bit rotary steerable drilling apparatus of FIG. 1, showing the first exemplary embodiment of the rotary seal assembly in greater detail.
Figure 4:
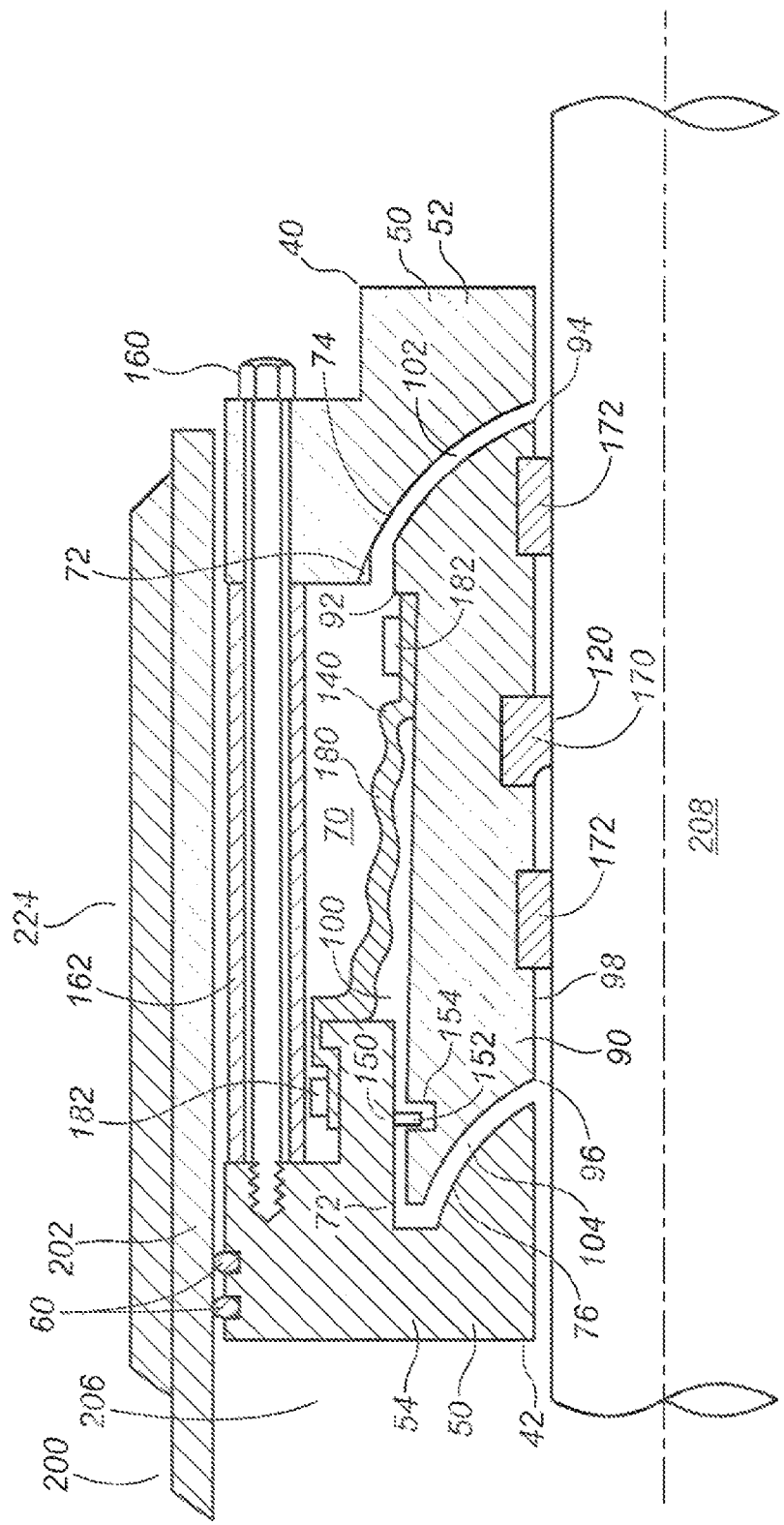
FIG. 4 is a partial longitudinal section assembly drawing of a second exemplary embodiment of a rotary seal assembly according to the invention, which may be substituted for the first exemplary embodiment of the rotary seal assembly in the point-the-bit rotary steerable drilling apparatus of FIG. 1.

FIGS. 1-3 depict a first exemplary embodiment of a rotary seal assembly according to the invention, in which the rotary seal assembly is provided as a lower rotary seal assembly in a point-the-bit rotary steerable drilling apparatus. FIG. 4 depicts a second exemplary embodiment of a rotary seal assembly according to the invention, which may also be provided as a lower rotary seal assembly in a point-the-bit rotary steerable drilling apparatus.

Figure 5:
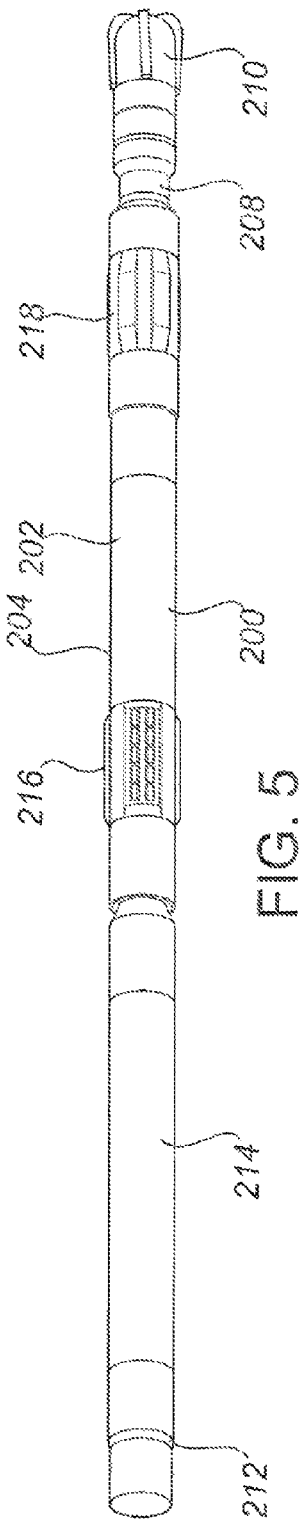
FIG. 5 is a pictorial view of an exemplary rotary steerable drilling apparatus, shown connected with a drill string.
Figure 6:
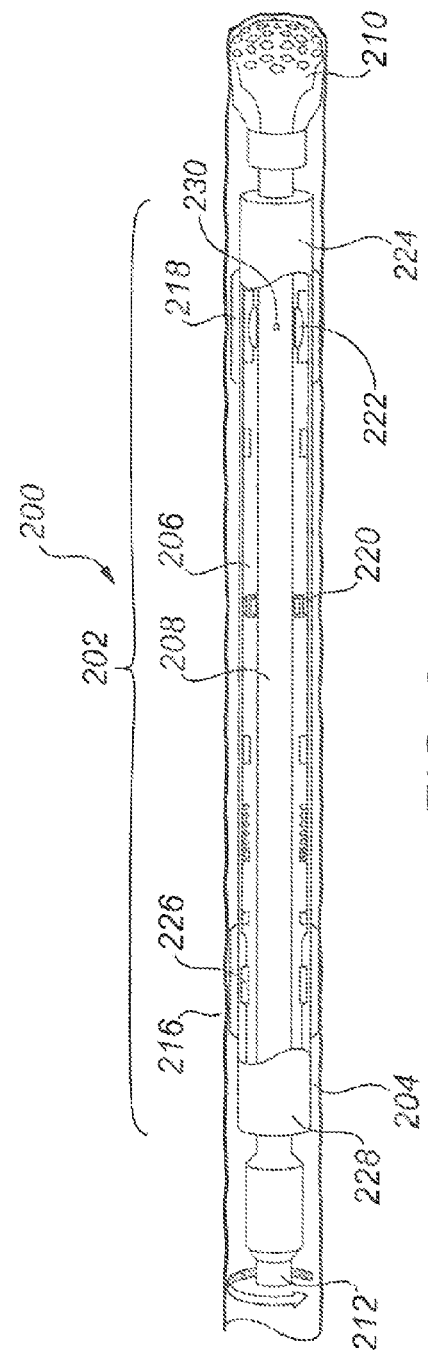
FIG. 6 is a schematic longitudinal section assembly view of the exemplary rotary steerable drilling apparatus depicted in FIG. 5, shown disconnected from the drill string.

FIGS. 5-6 depict an exemplary rotary steerable drilling apparatus in which the first exemplary embodiment, the second exemplary embodiment, and other embodiments of the rotary seal assembly may be used. FIG. 1 also depicts a lower portion of an exemplary rotary steerable drilling apparatus, including some of the components of the rotary steerable drilling apparatus.

FIGS. 1-6 are exemplary only. The rotary seal assembly of the invention may be used within the scope of the invention in any suitable apparatus and at any suitable location in any suitable apparatus, and the rotary seal assembly of the invention may be provided within the scope of the invention in embodiments other than the first exemplary embodiment and the second exemplary embodiment.

In the description of the first exemplary embodiment and the second exemplary embodiment which follows, features of the invention which are identical or equivalent in the two exemplary embodiments will be identified with the same reference numbers.

Referring to FIG. 1 and FIGS. 5-6 an exemplary point-the-bit rotary steerable drilling apparatus (200) is depicted. As non-limiting examples, the exemplary point-the-bit rotary steerable drilling apparatus (200) may be a rotary steerable drilling apparatus of the type described in U.S. Pat. No. 6,244,361 (Comeau et al) and/or U.S. Pat. No. 6,769,499 (Cargill et al).

Referring first to FIGS. 5-6, the exemplary point-the-bit rotary steerable drilling apparatus (200) is comprised of a housing (202) having an exterior (204) and an interior housing bore (206). A shaft (208) extends through the housing bore (206). The shaft (208) is rotatable relative to the housing (202).

In the exemplary point-the-bit rotary steerable apparatus (200), a drill bit (210) is connected with a distal end of the shaft (208), and a drill string (212) is connected with a proximal end of the shaft (208). The drill string (212) may include a drill string communication system (214) such as a measurement-while-drilling system.

In the exemplary point-the-bit rotary steerable drilling apparatus (200), an anti-rotation device (216) is connected with or integrated into the housing (202) adjacent to a proximal end of the housing (202), and a near-bit stabilizer (218) is connected with or integrated into the housing (202) adjacent to a distal end of the housing (202).

In the exemplary point-the-bit rotary steerable drilling apparatus (200), a deflection mechanism (220) is contained within the housing (202), which may be actuated to cause radial deflection of a portion of the shaft (208) within the housing bore (206).

In the exemplary point-the-bit rotary steerable drilling apparatus (200), a lower focal bearing (222), a lower rotary seal assembly (224), an upper bearing (226), and an upper rotary seal assembly (228) are located within the housing bore (206) to support the shaft (208) within the housing (202) and to provide seals between the housing (202) and the shaft (208).

The deflection mechanism (220) may be comprised of any structure, device or apparatus which is capable of causing the radial deflection of the portion of the shaft (208) within the housing bore (206). The radial deflection of the portion of the shaft (208) may result in bending of the shaft (208) within the housing bore (206). Additionally or alternatively, the radial deflection of the portion of the shaft (208) may result in articulation of the shaft (208) within the housing bore (206), if the shaft (208) is comprised of a joint (not shown) which facilitates such articulation.

In either case, the radial deflection of the portion of the shaft (208) by the deflection mechanism (220) causes tilting of the shaft (208) within the housing bore (206), thereby "pointing" the shaft (208) in a direction which is at an angle relative to the longitudinal axis of the housing (202).

In the exemplary rotary steerable drilling apparatus (200) depicted in FIG. 1 and FIGS. 5-6, the tilting of the shaft (208) is accommodated by the lower focal bearing (222), which acts as a fulcrum for the shaft (208). As a result, the radial deflection of the shaft (208) by the deflection mechanism (220) causes the shaft (208) to tilt within the housing bore (206) relative to a tilting focal point (230), which represents the center of tilting of the shaft (208).

In the exemplary rotary steerable apparatus (200), the tilting focal point (230) is provided by the lower focal bearing (222). In other apparatus, the tilting focal point (230) may be any real or imaginary point which represents the center of tilting of the shaft (208).

Referring again to FIG. 1, the lower focal bearing (222) is located axially between the deflection mechanism (220) and the lower rotary seal assembly (224). Since the lower focal bearing (222) acts as a fulcrum for the shaft (208), actuation of the deflection mechanism (220) will result in an amount of radial deflection of the shaft (208) within the housing bore (206) at the axial position of the lower rotary seal assembly (224), and will also result in an amount of tilting of the shaft (208) within the housing bore (206) relative to the tilting focal point (230) at the axial position of the lower rotary seal assembly (224).

The radial deflection and tilting of the shaft (208) in the vicinity of the lower rotary seal assembly (224) may negatively affect the performance of a conventional rotary seal assembly, which typically is not capable of accommodating such radial deflection and tilting.

The first exemplary embodiment of the rotary seal assembly according to the invention is depicted in FIGS. 1-3 for use as the lower rotary seal assembly (224) in the exemplary rotary steerable drilling apparatus (200) of FIGS. 5-6, and is described in the context of FIGS. 5-6 without limiting the potential application and use of the first exemplary embodiment in other apparatus and/or in other configurations.

Referring to FIGS. 1-3, in the first exemplary embodiment, the lower rotary seal assembly (224) is contained within the housing bore (206) in an annular space between the housing (202) and the shaft (208). The lower rotary seal assembly (224) has a leading end (40) and a trailing end (42). The leading end (40) of the lower rotary seal assembly (224) is in fluid communication with fluids outside of the housing (202), such as drilling fluid and borehole fluids. The trailing end (42) of the lower rotary seal assembly (224) is in fluid communication with fluids within the housing (202), such as lubricating oil and grease. The rotary steerable drilling apparatus (200) may be comprised of one or more pressure compensation systems (not shown) for substantially equalizing fluid pressures within the housing (202) with fluid pressures outside of the housing (202).

The lower rotary seal assembly (224) is comprised of a seal carrier retainer (50). The seal carrier retainer (50) may be constructed as a single piece or component, or may be comprised of a plurality of pieces or components.

In the first exemplary embodiment, the seal carrier retainer (50) is comprised of a leading seal carrier retainer component (52) and a trailing seal carrier retainer component (54). In the first exemplary embodiment, the leading seal carrier retainer component (52) and the trailing seal carrier retainer component (54) are connected together with a threaded connection (56) between the seal carrier retainer components (52, 54).

In some embodiments, the seal carrier retainer (50) may be connected with the housing (202) so that the seal carrier retainer (50) does not rotate relative to the housing (202). The seal carrier retainer (50) may be connected with the housing (202) in any suitable manner.

In the first exemplary embodiment, the trailing seal carrier retainer component (54) is connected with the housing (202) with a threaded connection (58) between the trailing seal carrier retainer component (54) and the housing (202) so that the seal carrier retainer (50) does not rotate relative to the housing (202).

In some embodiments in which the seal carrier retainer (50) is comprised of a plurality of pieces or components, the pieces or components of the seal carrier retainer (50) may be separately connected with the housing (202).

In some embodiments, a seal may be provided between the seal carrier retainer (50) and the housing (202) in order to provide a seal between the seal carrier retainer (50) and the housing (202).

In the first exemplary embodiment, a seal carrier retainer seal (60) is interposed between the trailing seal carrier retainer component (54) and the housing (202) in order to provide the seal between the seal carrier retainer (50) and the housing (202). In the first exemplary embodiment, the seal carrier retainer seal (60) is provided as a metal-to-metal seal.

In other embodiments, the seal carrier retainer seal (60), where provided, may be comprised of any other suitable type of seal.

In the first exemplary embodiment, the seal carrier retainer (50) defines a cavity (70) which surrounds the shaft (208). The cavity (70) is comprised of an inner cavity surface (72), a leading end cavity surface (74), and a trailing end cavity surface (76).

In some embodiments, the inner cavity surface (72) may be provided by the seal carrier retainer (50). In some embodiments, the inner cavity surface (72) may be provided by the housing (202) or by some other structure which is between the leading end cavity surface (74) and the trailing end cavity surface (76). In the first exemplary embodiment, the inner cavity surface (72) is provided by the seal carrier retainer (50).

In some embodiments, the seal carrier retainer (50) may be adjustable in order to vary a distance between the leading end cavity surface (74) and the trailing end cavity surface (76).

In the first exemplary embodiment, the leading seal carrier component (52) and the trailing seal carrier component (54) are movable relative to each other so that the seal carrier retainer (50) is adjustable in order to vary the distance between the leading end cavity surface (74) and the trailing end cavity surface (76).

More particularly, in the first exemplary embodiment, the distance between the leading end cavity surface (74) and the trailing end cavity surface (76) may be adjusted with the threaded connection (56) between the seal carrier retainer components (52, 54) by turning the seal carrier retainer components (52, 54) relative to each other. In the first exemplary embodiment, one or more optional shims (80) may be inserted in a gap (82) defined between adjacent surfaces of the seal carrier retainer components (52, 54) in order to limit the extent to which the seal carrier retainer components (52, 54) may be advanced toward each other.

The lower rotary seal assembly (224) further comprises a seal carrier (90). The seal carrier (90) may be constructed as a single piece or component, or may be comprised of a plurality of pieces or components.

In the first exemplary embodiment, the seal carrier (90) is comprised of an outer seal carrier surface (92), a leading end seal carrier surface (94), a trailing end seal carrier surface (96), and an inner seal carrier surface (98). In the first exemplary embodiment, the seal carrier (90) is positioned within the cavity (70) of the seal carrier retainer (50) and is retained by the seal carrier retainer (50) so that the seal carrier (90) surrounds the shaft (208) and so that the inner seal carrier surface (98) is adjacent to the shaft (208).

The seal carrier retainer (50) and the seal carrier (90) are arranged so that the seal carrier (90) is capable of an amount of radial deflection and an amount of tilting both relative to the seal carrier retainer (50).

In this regard, in the first exemplary embodiment, a seal carrier deflection space (100) is defined between the inner cavity surface (72) and the outer seal carrier surface (92) to accommodate radial deflection and/or tilting of the seal carrier (90) relative to the seal carrier retainer (50).

In addition, in the first exemplary embodiment, a leading interface (102) is defined between the leading end cavity surface (74) and the leading end seal carrier surface (94) and a trailing interface (104) is defined between the trailing end cavity surface (76) and the trailing end seal carrier surface (96). The leading interface (102) and the trailing interface (104) are configured to accommodate tilting of the seal carrier (90) relative to the seal carrier retainer (50).

In some embodiments, the leading interface (102) and the trailing interface (104) may be normal to a line extending from the tilting focal point (230). In some embodiments, the leading interface (102) and the trailing interface (104) may be curve-shaped. In some embodiments, the leading interface (102) may be at a substantially constant distance from the tilting focal point (230), and the trailing interface (102) may be at a substantially constant distance from the tilting focal point (230).

In the first exemplary embodiment, the leading interface (102) is a curve which is offset from the tilting focal point (230) by a leading radius distance (110) and the trailing interface (104) is a curve which is offset from the tilting focal point (230) by a trailing radius distance (112). As a result, in the first exemplary embodiment, the leading interface (102) and the trailing interface (104) each represent arcs of circles having centers at the tilting focal point (230).

The combination of the seal carrier deflection space (100), the leading interface (102) and the trailing interface (104) enable the seal carrier (90) to be capable of an amount of radial deflection and an amount of tilting relative to the seal carrier retainer (50).

A rotary shaft seal (120) is interposed between the seal carrier (90) and the shaft (208) in order to provide a seal between the seal carrier (90) and the shaft (208). The rotary shaft seal (120) may be comprised of any type or types and any number of suitable rotary seals, which may be arranged in any suitable configuration.

In the first exemplary embodiment, the rotary shaft seal (120) is carried by or otherwise associated with the seal carrier (90), and an optional wear sleeve (122) is mounted on the shaft (208) adjacent to the seal carrier (90) so that the rotary shaft seal (120) is also interposed between the seal carrier (90) and the wear sleeve (122).

In the first exemplary embodiment, the rotary shaft seal (120) is comprised of a primary rotary seal (124) and a rotary barrier seal (126). In the first exemplary embodiment, the rotary barrier seal (126) is positioned between the primary rotary seal (124) and the leading end seal carrier surface (94).

In the first exemplary embodiment, the primary rotary seal (124) is comprised of a Kalsi™ hydrodynamic rotary seal manufactured by Kalsi Engineering, Inc., and the rotary barrier seal (126) is comprised of a lip-type barrier seal such as an A6R™ barrier seal sold by CDI Energy Products.

In the first exemplary embodiment, the lower rotary seal assembly (224) is further comprised of an optional bushing (128) which is interposed between the seal carrier (90) and the shaft (208). The bushing (128) may assist in maintaining concentricity between the seal carrier (90) and the shaft (208). In other embodiments, the bushing (128) may be omitted, or more than one bushing (128) may be provided.

A seal carrier seal (140) is interposed between the seal carrier retainer (50) and the seal carrier (90) in order to provide a seal between the seal carrier retainer (50) and the seal carrier (90). The seal carrier seal (140) may be comprised of any type or types and any number of suitable seals, which may be arranged in any suitable configuration.

In the first exemplary embodiment, the seal carrier seal (140) is comprised of a leading seal carrier seal (142) interposed between the leading end cavity surface (74) and the leading end seal carrier surface (94), and a trailing seal carrier seal (144) interposed between the trailing end cavity surface (76) and the trailing end seal carrier surface (96).

In the first exemplary embodiment, a function of the trailing seal carrier seal (144) may be to assist in preventing substantial rotation of the seal carrier (90) relative to the seal carrier retainer (50).

In the first exemplary embodiment, the leading seal carrier seal (142) provides a seal between the lower rotary seal assembly (224) and fluids outside of the housing (202). The trailing seal carrier seal (144) provides a seal between the lower rotary seal assembly (224) and fluids within the housing (202), and provides a backup seal between the outside of the housing (202) and the inside of the housing (202).

In the first exemplary embodiment, the leading seal carrier seal (142) is a flange seal which is associated with the seal carrier retainer (50), and the trailing seal carrier seal (144) is a flange seal which is associated with the seal carrier retainer (50).

In the first exemplary embodiment, the leading seal carrier seal (142) and the trailing seal carrier seal (144) require an amount of engagement force with the seal carrier (90) in order to provide an effective seal between the seal carrier retainer (50) and the seal carrier (90).

In the first exemplary embodiment, this engagement force can be provided by adjusting the distance between the leading end cavity surface (74) and the trailing end cavity surface (76) with the threaded connection (56) between the seal carrier retainer components (52, 54) by turning the seal carrier retainer components (52, 54) relative to each other. A suitable number of shims (80) may then be inserted into the gap (82) between the seal carrier retainer components (52, 54) to maintain the desired distance between the cavity surfaces (74, 76).

In some embodiments, the lower rotary seal assembly (224) may be further comprised of a device for resisting rotation of the seal carrier (90) relative to the seal carrier retainer (50). Where provided, the device for resisting rotation may be comprised of any suitable structure, device or apparatus for preventing substantial relative rotation of the seal carrier retainer (50) and the seal carrier (90).

In the first exemplary embodiment, the engagement force between the seal carrier seals (142, 144) and the seal carrier (90) may assist in reducing a tendency of the seal carrier (90) to rotate with the shaft (208) as a result of the engagement between the rotary shaft seal (120) and the wear sleeve (122). In the first exemplary embodiment, this engagement force may not be sufficient to prevent substantial rotation of the seal carrier (90) relative to the seal carrier retainer (50).

As a result, in the first exemplary embodiment, the lower rotary seal assembly (224) is comprised of a rotation resisting device (150). In the first exemplary embodiment, the rotation resisting device (150) comprises an anti-rotation pin (152) threadably carried on the seal carrier retainer (50) and an anti-rotation pocket (154) defined by the seal carrier (90). When the seal carrier retainer (50) and the seal carrier (90) are assembled, the anti-rotation pin (152) may be threaded into the seal carrier retainer so that the anti-rotation pin (152) extends into the anti-rotation pocket (154), thereby preventing any substantial rotation of the seal carrier (90) relative to the seal carrier retainer (50).

In other embodiments, the rotation resisting device (150) and/or the trailing seal carrier seal (144) may be omitted, if a sufficient resistance to rotation of the seal carrier (90) relative to the seal carrier retainer (50) can be provided by other components of the rotary seal assembly.

The second exemplary embodiment of the rotary seal assembly according to the invention is depicted in FIG. 4. The second exemplary embodiment of the rotary seal assembly may be substituted for the first exemplary embodiment of the rotary seal assembly as the lower rotary seal assembly (224) in the exemplary rotary steerable drilling apparatus depicted in FIGS. 5-6, and is described in the context of FIGS. 5-6 without limiting the potential application and use of the second exemplary embodiment in other apparatus and/or in other configurations.

The description of the second exemplary embodiment of the rotary seal assembly is limited to the differences between the second exemplary embodiment and the first exemplary embodiment.

In the second exemplary embodiment, the seal carrier retainer (50) may be connected with the housing (202) in any suitable manner so that the seal carrier retainer (50) does not rotate relative to the housing (202) including, as a non-limiting example, a threaded connection (not shown) between the trailing seal carrier retainer component (54) and the housing (202).

In the second exemplary embodiment, a seal carrier retainer seal (60) is interposed between the trailing seal carrier retainer component (54) and the housing (202) in order to provide a seal between the seal carrier retainer (50) and the housing (202). The seal carrier retainer seal (60) may be comprised of any suitable seal. In the second exemplary embodiment, the seal carrier retainer seal (60) is comprised of two O-ring seals.

In the second exemplary embodiment, the seal carrier retainer (50) is adjustable in order to vary a distance between the leading seal cavity surface (74) and the trailing seal cavity surface (76).

In the second exemplary embodiment, the leading seal carrier retainer component (52) and the trailing seal carrier retainer component (54) are movable relative to each other so that the seal carrier retainer (50) is adjustable in order to vary the distance between the leading end cavity surface (74) and the trailing end cavity surface (76).

More particularly, in the second exemplary embodiment, the leading seal carrier retainer component (52) and the trailing seal carrier retainer component (54) are connected together with a threaded bolt (160) which engages with threads in the trailing seal carrier retainer component (54), and which may be used to vary the distance between the leading end cavity surface (74) and the trailing end cavity surface (76) by tightening or loosening the bolt (160). In the second exemplary embodiment, an optional spacer tube (162) may surround the bolt (160) and span a gap (82) defined between adjacent surfaces of the seal carrier retainer components (52, 54) in order to limit the extent to which the seal carrier retainer components (52, 54) may be advanced toward each other.

In the second exemplary embodiment, the rotary shaft seal (120) is carried by or otherwise associated with the seal carrier (90) and is interposed between the seal carrier (90) and the shaft (208). In the second exemplary embodiment, the wear sleeve (122) of the first exemplary embodiment is omitted so that the rotary shaft seal (120) is in direct contact with the shaft (208).

In the second exemplary embodiment, the rotary shaft seal (120) is comprised of a single rotary seal (170) which is positioned between two bushings (172). In the second exemplary embodiment, the single rotary seal (170) is comprised of a Kalsi™ hydrodynamic rotary seal manufactured by Kalsi Engineering, Inc. The bushings (172) on either side of the single rotary seal (170) assist in maintaining concentricity between the seal carrier (90) and the shaft (208), and assist in maintaining engagement between the single rotary seal (170) and the shaft (208) as the seal carrier (90) deflects and tilts relative to the seal carrier retainer (50).

In the second exemplary embodiment, the seal carrier seal (140) is comprised of a bellows seal (180) which extends within the cavity (70) of the seal carrier retainer (50) between the trailing seal carrier retainer component (54) and the outer seal carrier surface (92). The bellows seal (180) is fastened to the trailing seal carrier retainer component (54) and the outer seal carrier surface (92) with fittings (182).

The bellows seal (180) and the fittings (182) may be comprised of any suitable type of bellows-type seal and compatible fittings, and may be constructed of any suitable material. In the second exemplary embodiment, the bellows seal (180) is a metal bellows-type seal.

In the second exemplary embodiment, no seal is provided between the leading end cavity surface (74) and the leading end seal carrier surface (94), and no seal is provided between the trailing end cavity surface (76) and the trailing end seal carrier surface (96). As a result, no amount of engagement force is required at the leading end surfaces (74, 94) or the trailing end surfaces (76, 96) to facilitate effective seals at these surfaces.

Consequently, in the second exemplary embodiment, a rotation resisting device (150) is associated with the seal carrier retainer (50) and the seal carrier (90). In the second exemplary embodiment, the rotation resisting device (150) comprises the fitting (182) which fastens the bellows seal (180) to the trailing seal carrier retainer component (54) and an anti-rotation pocket (154) defined by the seal carrier (90). When the seal carrier retainer (50) and the seal carrier (90) are assembled, the bellows seal (180) may be fastened to the trailing seal carrier retainer component (54) so that the fitting (182) extends into the anti-rotation pocket (154), thereby preventing any substantial rotation of the seal carrier (90) relative to the seal carrier retainer (50).

It can be seen that an amount of radial deflection and/or tilting of the shaft (208) relative to the housing (202) is accommodated by any and all embodiments of the rotary seal assembly of the invention. As the shaft (208) deflects and/or tilts relative to the housing (202), the seal carrier (90) deflects and tilts relative to the seal carrier retainer (50), while maintaining the sealing capability of the rotary seal assembly.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. An apparatus comprising:
   (a) a housing having a housing bore;
   (b) a shaft rotatably extending through the housing bore, wherein the shaft is capable of an amount of radial deflection within the housing bore and an amount of tilting within the housing bore relative to a tilting focal point;
   (c) a deflection mechanism contained within the housing, wherein the deflection mechanism causes the radial deflection of the shaft within the housing bore;
   (d) a focal bearing located within the housing bore, wherein the focal bearing accommodates the tilting of the shaft within the housing bore, and wherein the tilting focal point is provided by the focal bearing; and
   (e) a rotary seal assembly contained within the housing bore such that the focal bearing and the tilting focal point are located axially between the deflection mechanism and the rotary seal assembly, the rotary seal assembly comprising:
      (i) a seal carrier retainer connected with the housing so that the seal carrier retainer does not rotate relative to the housing, wherein the seal carrier retainer defines a cavity surrounding the shaft, and wherein the cavity is comprised of an inner cavity surface, a leading end cavity surface, and a trailing end cavity surface;
      (ii) a seal carrier within the cavity of the seal carrier retainer, wherein the seal carrier is comprised of an outer seal carrier surface, a leading end seal carrier surface, and a trailing end seal carrier surface, wherein the seal carrier is capable of an amount of radial deflection and an amount of tilting both relative to the seal carrier retainer, and wherein the seal carrier is retained by the seal carrier retainer such that rotation of the seal carrier relative to the seal carrier retainer is prevented, wherein a seal carrier deflection space is defined between the inner cavity surface and the outer seal carrier surface, wherein a leading interface is defined between the leading end cavity surface and the leading end seal carrier surface, wherein a trailing interface is defined between the trailing end cavity surface and the trailing end seal carrier surface, wherein the leading interface is a curve which is offset from the tilting focal point by a leading radius distance, and wherein the trailing interface is a curve which is offset from the tilting focal point by a trailing radius distance, so that the leading interface and the trailing interface each represent arcs of circles having centers at the tilting focal point;
      (iii) a rotary shaft seal carried by the seal carrier between the seal carrier and the shaft; and
      (iv) a seal carrier seal interposed between the seal carrier retainer and the seal carrier.

2. The apparatus as claimed in claim 1 wherein the seal carrier seal is comprised of a leading seal carrier seal interposed between the leading end cavity surface and the leading end seal carrier surface.

3. The apparatus as claimed in claim 2 wherein the leading seal carrier seal is a flange seal which is associated with the seal carrier retainer.

4. The apparatus as claimed in claim 1 wherein the seal carrier seal is comprised of a trailing seal carrier seal interposed between the trailing end cavity surface and the trailing end seal carrier surface.

5. The apparatus as claimed in claim 4 wherein the trailing seal carrier seal is a flange seal which is associated with the seal carrier retainer.

6. The apparatus as claimed in claim 2 wherein the seal carrier seal is comprised of a trailing seal carrier seal interposed between the trailing end cavity surface and the trailing end seal carrier surface.

7. The apparatus as claimed in claim 6 wherein the leading seal carrier seal is a flange seal which is associated with the seal carrier retainer and wherein the trailing seal carrier seal is a flange seal which is associated with the seal carrier retainer.

8. The apparatus as claimed in claim 1 wherein the seal carrier retainer is adjustable in order to vary a distance between the leading end cavity surface and the trailing end cavity surface.

9. The apparatus as claimed in claim 8 wherein the seal carrier retainer is comprised of a leading seal carrier retainer component and a trailing seal carrier retainer component and wherein the leading seal carrier retainer component and the trailing seal carrier retainer component are movable relative to each other in order to vary the distance between the leading end cavity surface and the trailing end cavity surface.

10. The apparatus as claimed in claim 1, further comprising a seal carrier retainer seal interposed between the seal carrier retainer and the housing.

11. The apparatus as claimed in claim 1, further comprising a rotation resisting device associated with the seal carrier retainer and the seal carrier, for preventing rotation of the seal carrier relative to the seal carrier retainer.

12. The apparatus as claimed in claim 1 wherein the rotary shaft seal is comprised of a primary rotary seal and a rotary barrier seal, wherein the rotary barrier seal is between the primary rotary seal and the leading end seal carrier surface.

13. The apparatus as claimed in claim 12, further comprising at least one bushing interposed between the seal carrier and the shaft.

14. The apparatus as claimed in claim 1 wherein the apparatus is an apparatus for use in drilling a borehole.

15. The apparatus as claimed in claim 1 wherein the apparatus is a rotary steerable drilling apparatus.

16. The apparatus as claimed in claim 1 wherein the apparatus is a point-the-bit rotary steerable drilling apparatus.

17. The apparatus as claimed in claim 16 wherein the rotary seal assembly is a lower rotary seal assembly in the point-the-bit rotary steerable drilling apparatus, and wherein the lower rotary seal assembly is adjacent to a distal end of the housing.

* * * * *